Feb. 3. 1925.
C. J. REYNOLDS
INFLATION VALVE
Filed Jan. 17, 1920
1,525,150
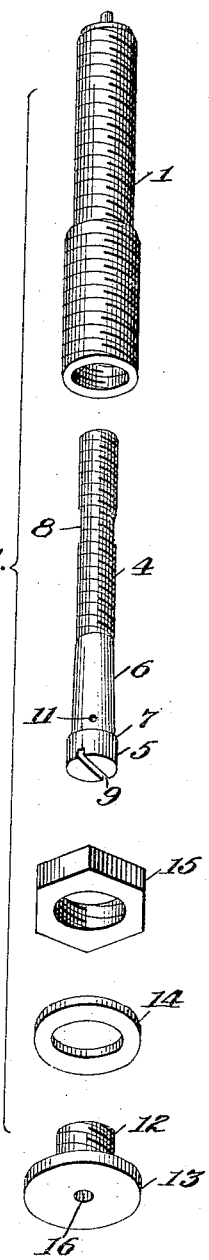
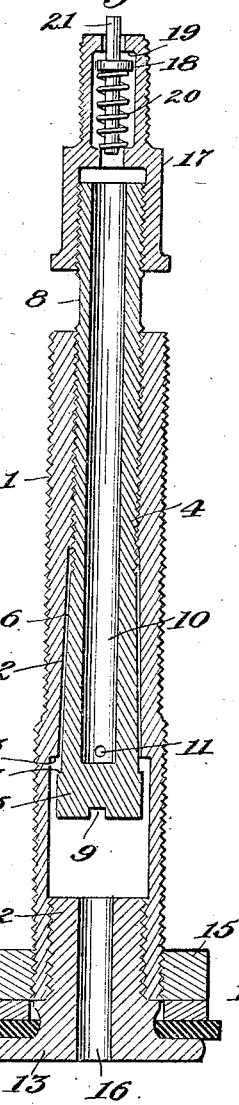
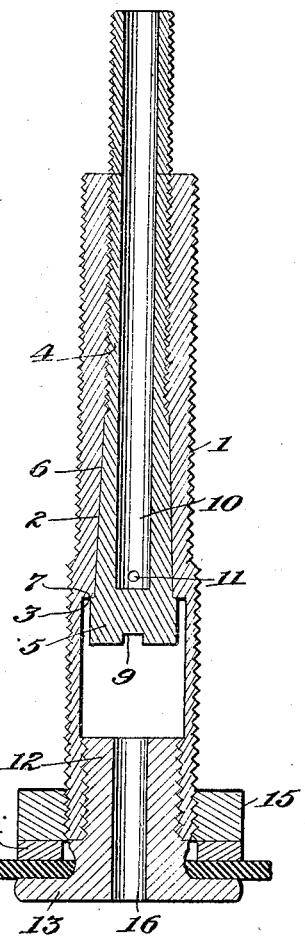
Inventor:
Charles J. Reynolds,
Wm H. Babcock & Son
Att'ys.

Patented Feb. 3, 1925.

1,525,150

UNITED STATES PATENT OFFICE.

CHARLES J. REYNOLDS, OF MELROSE, MASSACHUSETTS.

INFLATION VALVE.

Application filed January 17, 1920. Serial No. 352,117.

*To all whom it may concern:*

Be it known that I, CHARLES J. REYNOLDS, a citizen of the United States, residing at Melrose, in the county of Middlesex and State of Massachusetts, have invented certain new and useful Improvements in Inflation Valves, of which the following is a specification.

The present invention relates to inflation valves for pneumatic tires. The great difficulty in all known valves of this general type is liability to leaks. An almost imperceptible leak permits the tire to become slightly deflated and this, in turn, permits sand and other foreign matter to work in at the edges of the outer tube or shoe and get between it and the inner tube, thus causing by far the greater part of the " punctures." " Rim cuts " are also due almost entirely to this slow partial deflation from leaks. The leaks, of course, are due to faulty closure or operation of the valves, which, in turn, is most usually due to either complexity of construction, the use of springs in seating the valves, or some weakness in one or more of the several parts making up the inflation valve.

The main objects of the invention are to overcome the defects above noted and provide a strong, durable, leak-proof inflation valve of very few parts and simplest possible construction and consequently of very inexpensive manufacture.

Referring to the drawings:

Fig. 1 is a perspective view of the parts, except the master valve, separated and superposed.

Fig. 2 is a central vertical cross section of the invention as applied with master valve in place, the parts being open, or in position for inflation, and Fig. 3 is a similar view with parts closed and master valve omitted.

A snug metal-to-metal seat has been found most satisfactory in making a leak-proof valve for tire inflation. In the present invention this is accomplished by having the valve seat and face very gradually tapered throughout their faces or side walls and perfectly flat on their contacting end walls or faces. The taper, preferably, is about two one-thousandths of an inch to the inch, more or less.

In making the invention, three principal parts are required; the barrel, the spindle, and the base. With these, when assembled, a fourth element, the master valve, may be used, as shown in Fig. 2.

The barrel is a tubular member 1 internally screw threaded for about one-third of its length from one end, tapered as at 2, for about another one-third of its length, and counterbored to a greater diameter and internally screw threaded for the remainder of its length. The wall of the taper is smooth, of course, and is on a scale of about two one-thousandths of an inch to the inch, more or less. The inner end of the counterbore is ground down to form a flat, abrupt, annular shoulder or end valve seat or wall 3. The lower counter-bored portion of the barrel constitutes an air chamber. The spindle 4 is a tubular rod having a cylindrical head 5 at its lower end and externally screw threaded for about two-thirds of its length from its upper end. The remaining one-third between the head 5 and the lower end of the screw threads is tapered, as at 6, to cooperate with the tapered face 2 of barrel 1. And the upper annular face 7 of the head 5 is ground flat and smooth to fit snugly against shoulder 3. The spindle may be provided with two or more flattened faces 8 for the grip of a small wrench or other tightening tool, and have the head 5 diametrically slotted, as at 9, for the use of a screw driver or like tool for removing the spindle, if desired. Spindle 4 has a longitudinal bore 10 leading from its upper open end to, but not into or through, the head 5. Intersecting the lower end of this longitudinal bore at right angles and extending diametrically through the stem just above the annular face 7 is a passage 11 opening through the tapered wall 6 near its lower end. The diameter of head 5 is appreciably less than the interior diameter of the air chamber, resulting in a cylindrical space between the head 5 and air chamber wall, as will be clear on reference to Fig. 2. Into the lower end of the air chamber the post 12 of base 13 is screwed, the base 13 being seated within the inner tube of a tire in the usual manner and clamped thereto by a washer 14 forced to operative position by a nut 15 turned down on the external threads of the air chamber of barrel 1. Post 12, it will be noticed, extends upwardly only a short distance within the air chamber, roughly speaking, approximately one-third of the length of the air chamber. A feed passage 16 extends longitudinally through the post 12 and base 13 and communicates with the interior of the inner tube.

With the parts in the position of Fig. 2, air, either through the master valve hereinafter described or from an air pump attached to the spindle in the usual way, passes longitudinally down through bore 10, out through passage 11, between the tapered faces 2 and 6, between faces 3 and 7, into the air chamber by way of the cylindrical passage between the head 5 and air chamber wall, and then through the feed passage 16 and into the inner tube, inflating the tire. Of course, when the master valve or air pump is disconnected the air in the tire may pass out through the same passages in the reverse direction. To prevent this it is only necessary to apply a wrench to the flattened faces 8 and turn the spindle up to the position of the parts in Fig. 3. This brings the tapered faces 2 and 6 to snug-fitting, tight-closure position and at the same time makes a tight closure between the annular faces 3 and 7. As faces 2 and 6 meet the open ends of passage 11 are completely closed by the wall 6, making it impossible for air to pass either to or from the air chamber, and the very gradual degree of taper makes it unnecessary to use any other means than the screw thread connection to hold the parts in closed position.

The master valve above referred to is designed to prevent escape of air from the tire at the time that the pump hose is disconnected, and while the spindle is being turned up or tightened to closed position. It comprises an internally screw threaded tubular valve casing 17 adapted to be turned onto the upper projecting end of the spindle and having a spring-operated check valve 18 co-operating with a valve seat 19 and held normally closed by a coil spring 20 mounted about the lower end of the valve stem 21 and confined between the valve and a shoulder 22 through which the valve stem loosely passes. The opposite end of the valve casing 17 is externally screw threaded in the same way as the upper end of the spindle 4 for the attachment of the hose of an air pump in the usual way. The valve stem 21 projects through the screw threaded end of the valve casing 17 and acts as a guide in seating the valve 18 after each stroke of the pump in the usual way. Consequently, there is no possibility of escape of air from the inner tube while the spindle is being tightened.

It is clear that various changes may be made in the construction and arrangement of the different parts of the invention, as well as in the proportions of the parts, without in any way departing from the field and scope of the invention, and it is meant to include all such within this application, wherein only one preferred form has been disclosed for purposes of illustration.

Having described my invention, what I claim and desire to protect by Letters Patent is:

1. An inflation valve comprising, a barrel having a passage extending longitudinally therethrough and an air chamber in one end thereof and communicating with said passage, the wall of said passage and the adjoining wall of said chamber constituting valve seats or surfaces; and a hollow spindle adapted to be inserted through said air chamber and into said air passage of said barrel and provided with a valve face cooperating with the wall of the aforesaid passage, said spindle being provided with a passage communicating with the interior of said spindle and adapted to deliver air from the interior of the spindle into the chamber of said barrel; said spindle being provided with an enlarged head of a diameter less than that of said air chamber but greater than that of said air passage, said head having a valve face adapted to cooperate with the aforesaid adjoining wall of said air chamber.

2. An inflation valve comprising a barrel having an air chamber near one end thereof and having a comparatively great length of its inner wall tapered very gradually inwardly longitudinally from said air chamber, and a hollow spindle movable within said barrel and provided with an equal length of cooperating wall surface tapered very gradually inwardly longitudinally from its inner end, and having an air passage opening through said spindle wall and communicating with the interior of said hollow spindle, said passage being adapted to be closed by seating of the spindle surface on the cooperating surface of the barrel, and opened by unseating of said spindle surface.

3. An inflation valve comprising a barrel having an air chamber near one end thereof and having a comparatively great length of its inner wall tapered very gradually inwardly longitudinally from said air chamber, said air chamber having formed in one wall a flat valve seat disposed substantially at right angles to the aforesaid tapered surface and contiguous to said surface, a hollow spindle movable within said barrel and provided with an equal length of cooperating wall surface tapered very gradually inwardly longitudinally from its inner end and having an air passage through said spindle wall and communicating with the interior of said hollow spindle, and a valve face provided on said spindle and adapted to cooperate with the aforesaid flat valve seat, the parts being so proportioned and disposed that there will be simultaneous closure of the aforesaid passage and seating of said valve face, by seating of the spindle tapered surface on the cooperating surface of the barrel and seating of the valve face on the flat valve seat, respectively.

4. An inflation valve comprising a barrel having an air chamber in one end, a passage extending longitudinally through said barrel and communicating with said air chamber, and a valve seat facing the outer end of said air chamber and extending around the end of said passage where it enters said chamber; a hollow spindle adapted to be inserted through said air chamber into said barrel and to project considerably beyond the end of said barrel, said spindle being provided with an enlarged head having a valve face adapted to cooperate with the aforesaid valve seat, said spindle being also provided with an air passage communicating with the interior thereof and adapted to deliver air from said spindle into the passage of the aforesaid barrel; and a post removably seated within the outer end of said air chamber.

5. An inflation valve comprising a barrel having an air chamber in one end, a passage extending longitudinally through said barrel and communicating with said air chamber, said passage having a comparatively great length of its inner wall tapered very gradually longitudinally from said air chamber; a hollow spindle adapted to be inserted through said air chamber and into said passage and provided with a tapered surface cooperating with the tapered wall face of the aforesaid passage, said spindle being provided with an air passage communicating with the interior of the spindle and adapted to deliver air from the interior of the spindle into the passage of said barrel; and means for adjusting said spindle within said barrel to close or open the passage through said spindle.

6. An inflation valve comprising a barrel having an air chamber in one end, a passage extending longitudinally through said barrel and communicating with said air chamber, and a valve seat facing the outer end of said air chamber and extending around the outer end of said passage where it enters said chamber, said passage having a comparatively great length of its inner wall tapered very gradually inwardly longitudinally from said air chamber; a hollow spindle adapted to be inserted through said air chamber and into said passage and provided with a tapered surface cooperating with the tapered wall face of the aforesaid passage, said spindle being provided with an air passage communicating with the interior of the spindle and adapted to deliver air from the interior of the spindle into the passage of said barrel, said spindle being provided with an enlarged head having a valve face adapted to cooperate with the aforesaid valve seat; and means for adjusting said spindle within said barrel, the parts being so proportioned and disposed that there is simultaneous contact of the two tapered faces and the valve seat and valve face.

7. An inflation valve comprising a barrel having an air chamber in one end, a passage extending longitudinally through said barrel and communicating with said air chamber, said passage having a comparatively great length of its inner wall tapered very gradually inwardly longitudinally from said air chamber; a hollow spindle adapted to be inserted through said air chamber and into said passage and to project considerably beyond the end of said barrel, said spindle being provided with a tapered face cooperating with the tapered wall of the aforesaid passage and having an air passage communicating with the interior of said spindle and adapted to deliver air from the interior of said spindle into said passage; a valve casing adapted to be coupled into the projecting end of said spindle; and a check valve within said casing and adapted to control flow of air to said spindle.

8. An inflation valve comprising, a barrel having an air chamber and a longitudinal air passage communicating therewith and adjoining valve surfaces on the walls of said passage and chamber, a tubular spindle movable within said barrel and provided with cooperating valve surfaces and having a passage communicating with said air chamber, a valve casing removably mounted on said spindle, and a valve in said casing and adapted to control flow of air into said spindle.

In testimony whereof, I have signed my name to this specification.

CHARLES J. REYNOLDS.